United States Patent [19]

Newberry

[11] 3,839,917

[45] Oct. 8, 1974

[54] STOP MECHANISM FOR UHF TUNER OR THE LIKE

[75] Inventor: Meigs W. Newberry, East Longmeadow, Mass.

[73] Assignee: General Instrument Corporation, Newark, N.J.

[22] Filed: May 11, 1973

[21] Appl. No.: 359,521

[52] U.S. Cl. ........ 74/10.41, 74/10.52, 116/124.1 R, 192/139

[51] Int. Cl. ....... H03j 1/02, H03j 1/14, F16d 71/00

[58] Field of Search ........................ 74/10.41, 10.52; 116/124.1 R; 192/139

[56] References Cited

UNITED STATES PATENTS

| | | | |
|---|---|---|---|
| 2,164,309 | 7/1939 | Collins | 192/139 |
| 3,618,405 | 11/1971 | Ishida | 74/10.52 |
| 3,774,459 | 11/1973 | Valdettaro | 74/10.41 |
| 3,777,576 | 12/1973 | Miner | 74/10.41 |

*Primary Examiner*—Allan D. Herrmann

[57] ABSTRACT

A stop mechanism for a detented rotary assembly uses the detent wheel-detent arm assembly to effectuate the stop function. An element carried by the detent arm is moved as the detent arm goes into and moves out from the recesses on the detent wheel, with a selected one or more of the parts between the detent recesses being elongated so that the detent arm, when engaged therewith, moves to an increased degree, thereby moving the element carried thereby into engagement with a stop element. The stop element in turn may be mounted in a movable fashion so as to be brought into the path of movement of the element carried by the detent arm only after a predetermined number of revolutions of the assembly have been carried out. The stop element may advantageously be associated with one of the indicators of a digital indication system, thereby to permit rotation of the assembly through a predetermined number of revolutions before the stop mechanism becomes effective.

21 Claims, 6 Drawing Figures

STOP MECHANISM FOR UHF TUNER OR THE LIKE

The present invention relates to a stop mechanism particularly well adapted for use in conjunction with a UHF detented tuning mechanism designed to tune to a large number of communication channels, although in its broader aspect the stop mechanism is adaptable for use in other environments as well.

Tuners designed when actuated to tune a receiving set such as a television receiver to a preselected one of a plurality of stations or channels are well known and take many forms. Insofar as the present invention is concerned, the precise nature of the means employed in the communications receiver itself to effect tuning to a particular reception frequency forms no part of the present invention. What this invention is directed to is the mechanism by means of which a tuning element, whatever its character, is appropriately conditioned for precise reception of a particular station or channel, and more specifically, this invention is directed to a mechanism by means of which the rotation of the mechanism is stopped at the opposite ends of the tuning spectrum. The invention is here specifically disclosed in connection with the tuner designed to effect tuning over the entire UHF band, in which there are 70 or more individual channels. To provide a device capable of tuning to any selected one of the 70 or more available UHF channels with sufficient accuracy so as to be able to distinguish in its tuning between any two adjacent channels presents many problems, both mechanical and electrical. The public has become accustomed to step-by-step TV tuning in connection with the 13 available channels in the VHF band, and therefore expects similar tuning capability in the UHF band, and the very high precision of tuning which is required because of the relatively close spacing of those channels has given rise to special new mechanical arrangements for the UHF TV tuners.

It is important to the tuner manufacturer to produce tuners of extremely small size and at an exceedingly low cost. Set manufacturers are under pressure from the consumers to produce TV receiving sets which take up as little space as possible. The TV tube itself requires an appreciable amount of space, the electrical circuitry involved in tuning also presents certain space problems, and consequently it is desired by the set manufacturers that the mechanical arrangements provided for effecting tuning from one channel to another be of minimal size. Moreover, since the sales of TV sets to the public are very competitive as to price, and since a given manufacturer produces very large numbers of receiving sets, a saving of but a few cents in cost per set, or per tuner, can represent a very appreciable amount of money when a full year's sales are taken into consideration.

The requirements for small size and low cost represent only one side of the coin. The tuner must also be sturdy and reliable, since it will be operated by the owner of a TV set many hundreds of thousands of times over the life of the set for changing from one channel to another, and any failure of the mechanical tuner portion of the receiving set will be treated by the consumer, who does not know the cause of a given malfunction but is only interested in the fact that the malfunction has occurred at all, as simply a flaw in the set as a whole, thus reflecting directly upon the reputation of the set manufacturer and affecting the ability of the manufacturer to sell a set of his manufacture to that person in the future. For comparable reasons, it is essential that the mechanical tuning arrangement be able to be operated by the user with extreme ease and with simplicity of manipulation. Hence the structures involved must be sturdy and so constructed as to move readily and without bending.

Mechanical arrangements can be, and have been, devised capable of effecting step-by-step tuning from one TV channel to another, not only within the 13 channel VHF spectrum, but also within the 70 channel UHF spectrum, and these prior art constructions meet the above-set forth requirements to greater or lesser degrees. However, any design of the prior art had to represent a very significant compromise. Sturdiness can be achieved at the expense of size and weight. Low cost can be achieved at the expense of sturdiness. To achieve reliability of action with a small device is much more difficult than with a large device. Attempts to reduce size and weight may result in parts which are improperly supported or mounted and which therefore will tend to fail in use. Increased facility of operation may call for the use of greater number of parts or larger parts then would otherwise be the case, thus adding to size and cost. Other "trade-offs" will be apparent.

While it is theoretically possible to provide a mechanism which is continuously rotatable and which will tune through the UHF spectrum and then go back to the beginning of that spectrum and start tuning from channel to channel all over again, there are mechanical and electrical considerations which appear to make such an arrangement unfeasible. Accordingly, stop mechanisms must be provided effective at one end and the other of the UHF spectrum. Stop mechanisms involving less than a complete rotation of the mechanism in question are common, but when 70 channels are to be tuned, and hence seventy different positions must be detented, an excessively large detent wheel is required if detenting accuracy is not to be sacrificed. Hence multi-turn detent wheels are often employed in mechanisms of the type in question. This greatly complicates the stop problem. Stop mechanisms separate and distinct from the other functioning parts of the tuner, and connected to those parts by means of stepdown gearing or the like, can be used, but they add appreciably to the size and cost of the tuning assemblies.

It is a prime object of the present invention to devise a stop arrangement for a tuner which will achieve the desired objectives of reliability, sturdiness, low cost, and low size and weight, to an optimum degree with respect to all of said requirements, and with a minimal amount of sacrifice with respect to any given requirement in order to achieve required results with respect to some other requirement.

It is a more specific object of the present invention to provide a TV tuner construction in which the stop mechanism is constituted to as large a degree as possible by parts which are otherwise required in the operating mechanism.

It is a further object of the present invention to devise a stop mechanism which cooperates with and uses the already existing detent wheel and detent arm of the tuning mechanism.

It is an additional object of the present invention to devise a stop mechanism which, by virtue of its construction and arrangement, can be adapted to provide for effective stop action at given points in the rotation of a controlled member while permitting that controlled member to make a plurality of complete rotations.

It is another object of the present invention to devise a stop mechanism of the multi-turn type in which the stopping is effected at a particular point of cooperation with a preexisting position indicator otherwise required in the operating mechanism.

Yet another object of the present invention is to provide a stop mechanism, particularly for a TV tuner construction, in which all of the active parts of the stop mechanism are sturdily and reliably mounted for long life and sure and easy rotation, yet in which parts take up a minimal amount of space and are of minimal cost.

A still further object of the present invention is to define a stop mechanism, particularly for a TV tuner assembly, the parts of which can be readily and inexpensively manufactured and assembled, thereby to produce a compact and reliable device.

In accordance with the present invention, the stop function is effected by cooperation between a stop element and a second element which is operatively connected to the detent arm which cooperates with the detent wheel to position the rotating portion of the tuner or other mechanism. That detent arm moves into and out from the detent recesses on the detent wheel, and the element carried by that part moves correspondingly. For stop purposes, one of the portions of the detent wheel interposed between adjacent detent recesses extends out radially somewhat further than the other portions, so that when the detent arm moves thereover it and the element carried thereby are moved to a greater degree than normal. The stop element is designed to be interposed in the path of movement of the element carried by the detent arm when that element is thus moved to the increased degree described, thereby to prevent the element from thus moving, and thereby preventing the detent arm from moving out far enough to let the detent wheel rotate further. If less than one complete rotation of the detent wheel is desired, the stop element may be fixed in position; however, if more than one revolution of the detent wheel is required, the stop element is itself movable between a first or stand-by position outside the path of movement of the element connected to the detent arm and a second or stop position in that path of movement, thereby to prevent the element and hence the detent arm from thus moving. Suitable means are provided to move the stop element to its second or "stop" position after the detent wheel has made a predetermined number of revolutions in a given direction. That means may well comprise a portion of the position indicator which is associated with the mechanism. For example, in UHF TV tuners where some seventy channels must be tuned, it is common to employ a digital type position indicator having one part which indicates "units" and another part which indicates "tens." The "tens" part may be used to position the stop element; indeed, the stop element may well be defined, as is here specifically disclosed, by the periphery of the "tens" index part itself.

As a result, only a minimal number of parts other than those already required in the tuning mechanism need be utilized to accomplish the desired stop function, with virtually no additional space being required over and above that utilized for the other parts of the tuning mechanism.

To the accomplishment of the above, and to such other objects as may hereinafter appear, the present invention relates to the structure and arrangement of a detent-limit stop assembly particularly well adapted for use in a TV tuner, as defined in the appended claims and as described in this specification, taken together with the accompanying drawings, in which:

Figure 1:
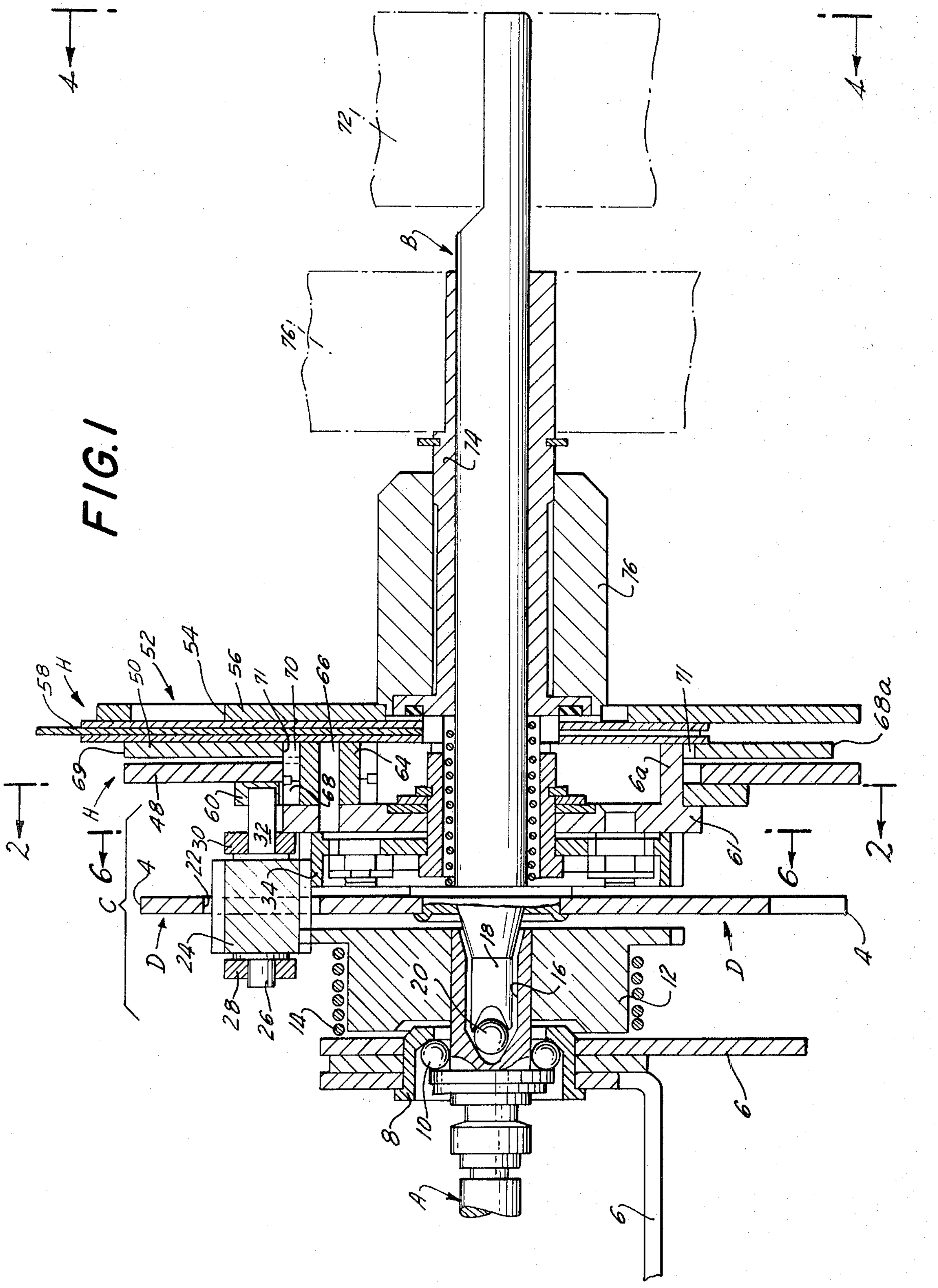
FIG. 1 is a side cross-sectional view of an exemplary embodiment of the present invention, illustrated in conjunction with a tuner designed for UHF detented tuning.

Because the detent-limit stop assembly of the present invention can be used with devices other than UHF TV tuners (although it has been specifically designed for use with such tuners) the tuner itself plays no part in the present invention, and therefore is not illustrated. It will be understood, however, that the tuner may be constituted by a rotary variable condenser-tuned transmission line or the like, provided with a shaft generally designated A which is, in effect, the output shaft of the mechanism here disclosed, rotation of that shaft A effecting a tuning operation. The output shaft A is designed to be rotated by an input shaft generally designated B, the driving mechanism generally designated C operatively connecting the input shaft B to the output shaft A. The driving mechanism C includes a detent wheel generally designated D which rotates as the input shaft B is rotated and which is detent-maintained in different rotational positions through cooperation with a detent arm generally designated E. The outer surface of the detent wheel D is defined by recesses 2 separated by radially outwardly projecting portions 4, with one of those portions **4*a* projecting out to a greater distance than the other portions. As the detent wheel D is rotated from one detented position to the next, the detent arm E will move out and then in as it passes over the portion 4 interposed between the adjacent detent wheel recesses 2, and when the detent arm E is caused to move over the detent wheel portion 4*a* it will move out to a greater degree than it moves when it traverses the other shorter portions 4. Operatively connected to the detent arm E is a first stop element F which moves with and to substantially the same extent as the arm E. A second and cooperating stop element G is provided which, when stopping is to be effected, is interposed in the path of movement of the element F when the arm E negotiates the longer detent projection 4*a*. The stop element G thus prevents the stop element F from moving through its proper path of movement, the detent arm E is not permitted to negotiate the detent wheel portion 4*a***, rotation of the detent wheel D is prevented, and a stop effect is achieved.

For multi-turn operation of the detent wheel D, the second stop element G is normally located out of the extreme path of movement of the element F, thus permitting that degree of movement to the element F and therefore permitting the detent arm E to negotiate the long projection 4*a* on the detent wheel D. However, after a predetermined number of revolutions of the detent wheel D, the second stop element G is moved into the extreme path of movement of the element F, thereby to effect the stop function. The device may be provided with a position indicator generally designated H, which may be of the digital type, and a portion of that position indicator may itself define the second stop element G. As here disclosed the second stop element G is defined by the periphery of the "tens" indicator part of that position indicator H. One part of that periphery is shaped to be in the extended path of movement of the first stop element F, but another portion of the periphery is cut away so that when it is opposite the stop element F it will not interfere with its movement. The location of the cut-away portion of the periphery is determined by the number of rotations of the detent wheel D that are to be permitted before the stop mechanism comes into effect.

In the specific embodiment of the present invention here disclosed, the output shaft A is journalled in support assembly 6, as by means of cup-shaped retainer 8 and the ball bearings 10. A gear 12 is fast on the shaft A, and a torsion spring 14 may be effective between the gear 12 and the support assembly 6 so as to impart a resilient rotational force to the gear 12, thereby to take up backlash and play.

The right hand end of the output shaft A is recessed, at 16, and the tip 18 of the input shaft B is received in that recess and journalled therein by means of ball bearing 20, thus permitting relative rotation between the input shaft B and the output shaft A. The detent wheel D is mounted fast on the input shaft B, and extends out radially therefrom to an appreciable degree, being located just to the right, as viewed in FIG. 1, of the gear 12. The periphery of the detent wheel D is provided with detent recesses 2 separated by the portions 4 and 4*a*, as described above. As here disclosed, the detent wheel D is provided with 10 detent recesses 2. Hence, for the tuning of 70 channels such as are provided in UHF, the detent wheel D will have to make seven rotations. The detent wheel D is provided with an aperture 22 through which a pinion 24 freely rotatably extends, that pinion 24 extending out to both sides of the detent wheel D and being mounted on shaft 26. The shaft 26 is mounted in brackets 28 and 30 located on opposite sides of the detent wheel D and secured thereto as by means of rivets or bolts 32. That portion of the pinion 24 which extends to the left of the detent wheel D meshes with the gear 12. That portion of the pinion 24 which extends to the right of the detent wheel D meshes with a nominally stationary gear 34 which is mounted on additional fixed supporting structure 6'. Hence rotation of the input shaft B will cause the detent wheel D to rotate, the pinion 24 will be carried thereby around the fixed gear 34, therefore being rotated, and its rotation will be transmitted to the gear 12, causing a stepped down rotation of the output shaft A. This arrangement constitutes the operative connection C between the input shaft B and the output shaft A.

Figure 2:
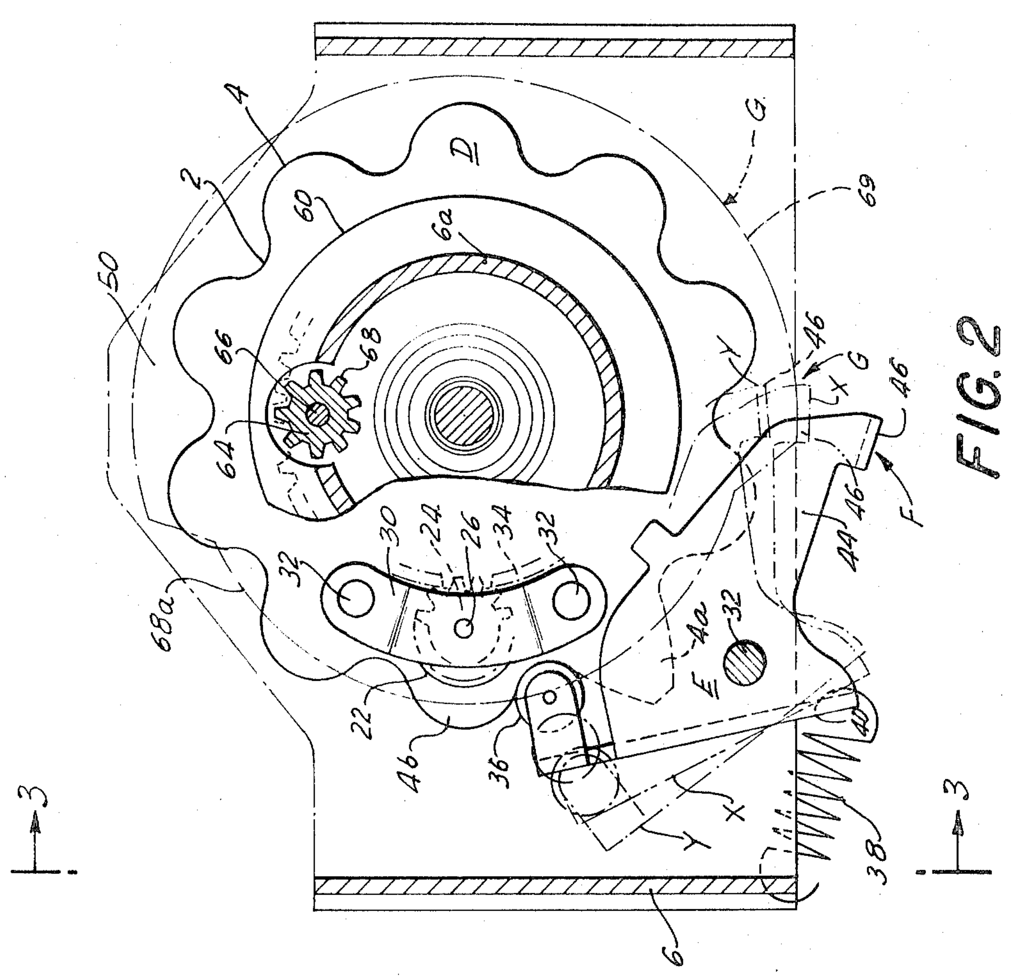
FIG. 2 is a cross-sectional view taken along the line 2—2 of FIG. 1 but showing the detent wheel in a different rotational position from that of FIG. 1.

The detent arm E cooperates with the periphery of the detent wheel D so as to produce the desired detenting action. The arm E is pivotally mounted between the supporting assembly 6 and a fixed meshing plate 56 by means of shaft 32. It carries a roller 36 which engages the periphery of the wheel D, and it is urged into rotation in a clockwise direction, as viewed in FIG. 2, toward the wheel D, by means of spring 38 tensioned between a portion of the supporting structure 6 and a point 40 on the arm E located to the opposite side of the pivotal shaft 32 from the roller 36. The detent arm E is provided with an extension 44 projecting out from the shaft 32 in a direction opposite to the location of the roller 34, that extension 44 carrying a finger 46 which constitutes the first stop element F.

Figures 4, 5, 6:
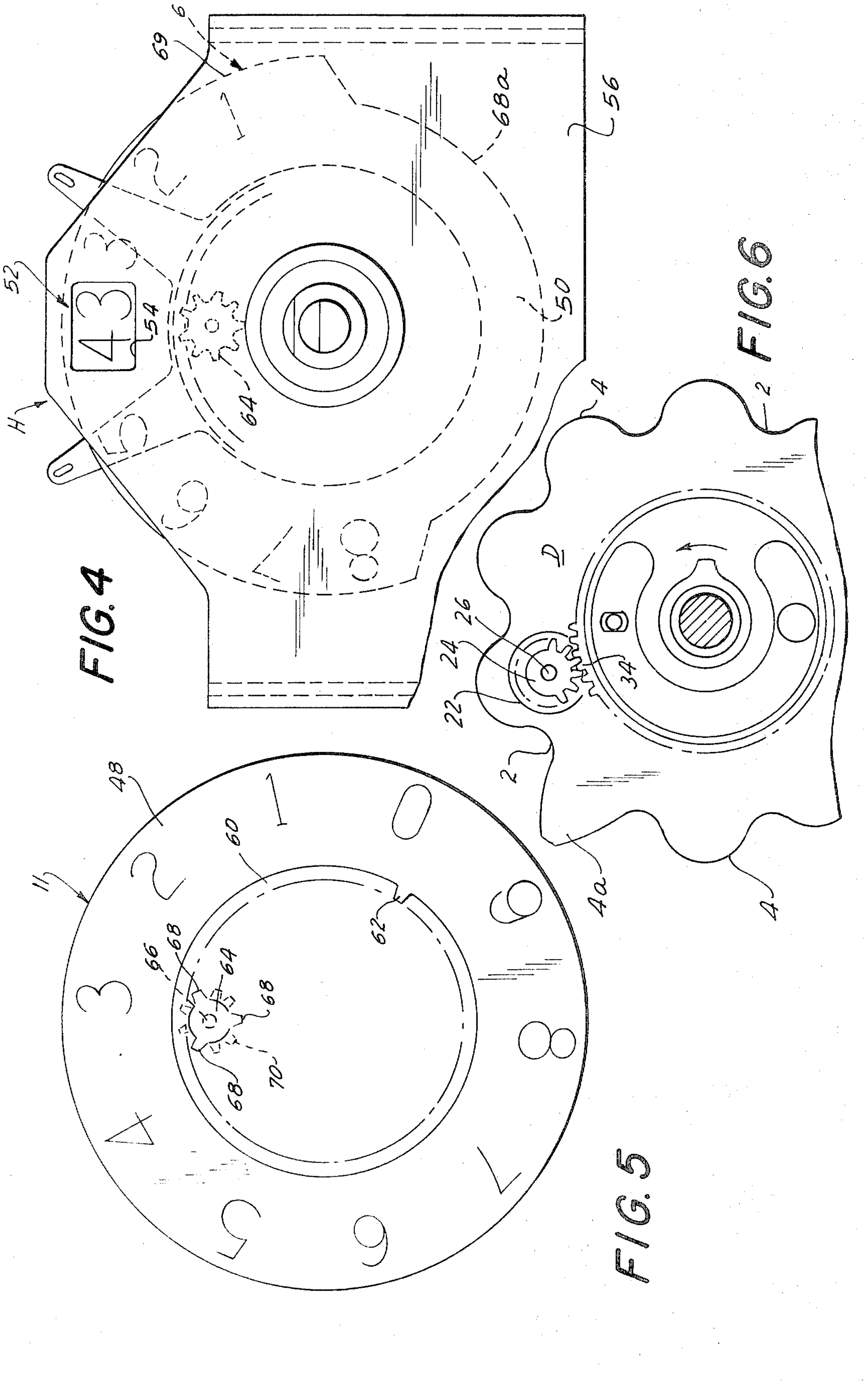
FIG. 4 is a front elevational view of the position indicator portion of the tuner.
FIG. 5 is a front elevational view of a detailed portion of the position indicator.
FIG. 6 is a fragmentary end elevational view of a portion of the detent wheel and associated mechanism taken along the line 6—6 of FIG. 1.

The decade-type position indicator H comprises a pair of indicator rings 48 and 50 independently rotatably mounted one in front of the other on fixed ring support 6*a*. The rings 48 and 50 carry indicia, the ring 48 carrying "units" indicia and the ring 50 carrying "tens" indicia. Since at least the ring 50 is transparent, the indicia carried by both of the rings are rendered visible at a viewing station generally designated 52 and defined by a window 54 in the fixed masking plate 56, appropriate transparent protective layers 58 being interposed between the masking plate 56 and the "tens" ring 50. The indicia carried by the two rings 48 and 50 will be appropriately laterally displaced so that, as may be seen in FIG. 4, the indicia carried by the respective rings and exposed at the viewing station 52 will be in proper spatial relation so as to indicate a given number corresponding to the channel then being tuned, for example, as shown in FIG. 4, channel 43.

The position indicator H is actuatingly driven by the detent wheel D. To that end the shaft 26 on which the gear 24 is mounted is extended out to the right, as viewed in FIG. 1, where it is secured to ring 60 rotatably mounted on the support 6*a*. The ring 60 has a single internal gear tooth 62 thereon. The "units" indicator ring 48 is made fast to the ring 60 so as to rotate therewith, thereby making one full rotation for each full rotation of the detent wheel D. A pinion 64 is mounted rotatably on shaft 66, the shaft being secured to fixed masking plate 56. The pinion 64 has a first set of teeth 68 which mesh with the single tooth 62 on the inside of the ring 60 and a second set of teeth 70 which mesh with gear teeth 71 formed on the inner surface of the "tens" indicator ring 50. The teeth 68 are fewer in number than the teeth 70, as a result of which the "tens" ring 50 is caused to move a distance appropriate to bring the next succeeding "tens" number carried by it into position at the viewing window 52 only after the "units" ring 48 (and hence the detent wheel D and the ring 60 moving therewith) has made a complete rotation.

Figure 3:
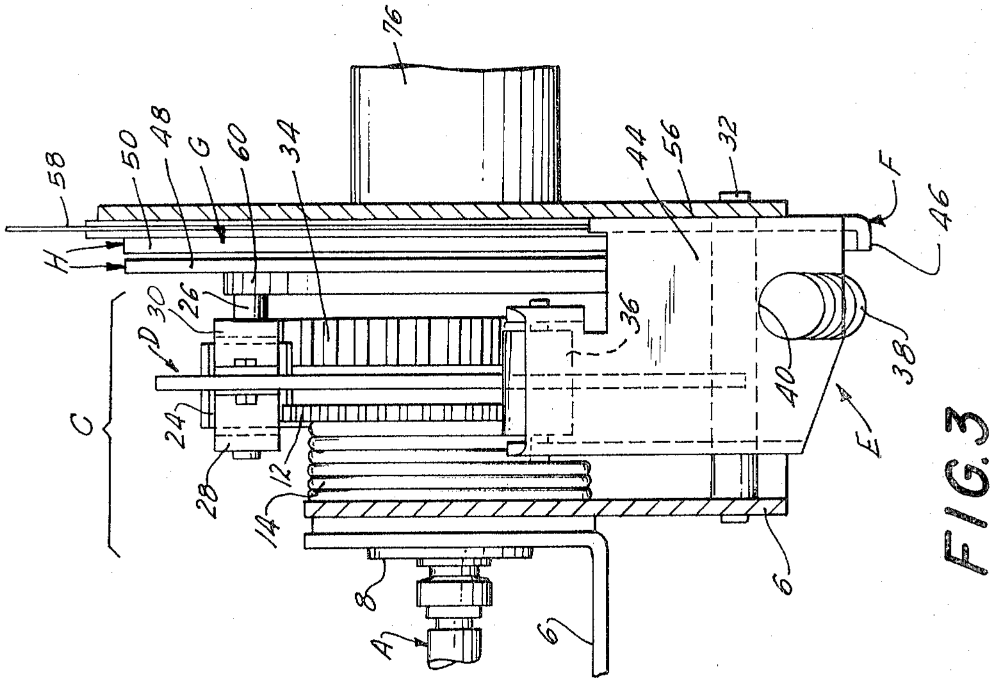
FIG. 3 is a cross-sectional view taken along the line 3—3 of FIG. 2.

As may perhaps best be seen from FIGS. 1 and 3, the "units" ring 48 is spaced somewhat to the left from the fixed plate 56 and the portion of the extension 44 to the detent arm E which carries the finger 46 is received in that space. As may be seen from FIG. 2, when the roller 34 carried by the detent arm E is received in a detent recess 2, thereby producing the detent function, the detent arm E of extension 44 and the finger 46 will take the position shown in solid lines in that figure, the finger 46 then being well outside the periphery 69 of the "tens" ring 50. When the detent wheel D is rotated in a counterclockwise direction from its position shown in FIG. 2 the roller 34 will move radially out so as to negotiate the short portion 4*b*, in so doing the detent arm E will be pivoted in a counterclockwise direction and the finger 46 will be moved inwardly toward the "tens" ring 50 to the broken line position identified as X in FIG. 2, but in that broken line position the finger 46 will still be outside the periphery 69 of the ring 50. However, if the detent wheel D were to be rotated in a clockwise direction as viewed in FIG. 2, the roller 34 would have to negotiate the long portion 4*a* projecting out from the detent wheel D. Because the portion 4*a* extends out radially a greater distance than the portion 4*b*, the detent arm E would therefore be pivoted to a greater extent to the broken line position identified in FIG. 2 by the letter Y, and when that occurs the finger 46 would have to move to a position inside the periphery 69 of the "tens" ring 50. As is apparent from FIG. 3, the path of travel of the finger 46 to the position indicated by the broken lines Y in FIG. 2 would be prevented by the periphery 69 of the "tens" ring 50 unless that ring 50 were in a rotative position (such as is shown in FIG. 4) in which the inset or cutaway portion 68*a* of its periphery were to be opposite the finger 46.

It is this arrangement which provides the stop action. When the non-inset peripheral portion 69 of the "tens" ring 50 is opposite the finger 46 the detent arm E will be positively prevented from pivoting sufficiently for its roller 34 to negotiate the long outwardly projecting portion 4*a* on the detent wheel D, although that peripheral portion 69 will have no such limiting effect when the roller 34 attempts to negotiate one of the shorter projections 4*b* on the detent wheel D. When the roller 34 is prevented from moving outwardly, the outwardly projecting detent wheel portion 4*a* is likewise prevented from moving, and hence a stop effect is achieved.

The rotational position and extent of the recessed peripheral portion 68*a* of the ring 50 is designed in a given installation to provide the desired number of rotations of the input shaft B, and in particular of the detent wheel D, before a stop effect is achieved. When the recessed peripheral portion 68*a* of the ring 50 is opposite the finger 46 the detent arm E is permitted to negotiate the long outer projection 4*a* on the detent wheel D without any obstruction. However, after the desired number of turns of the detent wheel D have been achieved, as reflected by the positioning of the "tens" ring 50, the next time that the long projecting portion 4*a* comes into engagement with the roller 34 carried by the detent arm E, the detent arm E will not be permitted to let the projection 4*a* pass, and hence rotation is positively stopped.

For a tuner application the input shaft B can be provided with a tuning knob 72, as is conventional, but it will be appreciated that other types of input could also be employed. Because of the TV tuner aspect of the embodiment here specifically illustrated, and because in such a tuner fine tuning is often desired after a given channel has been selected, certain portions of the specifically illustrated apparatus are designed for that purpose, in particular, the fine tuning shaft 74 and the fine tuning knob 76 secured thereto, but since the fine tuning has no effect on the detent-limit stop assembly which forms the subject matter of this invention, the portions of the fine tuning connections have been only incompletely disclosed, and are not here described at all. It may be noted, however, that the input shaft B is coaxially secured in and journalled in the fine tuning shaft 74, which is in turn journalled in bushing 76 fixed to plate 56.

It will be appreciated from the above description that a stop mechanism with controlled multi-turn potentialities has been designed utilizing only those structural elements which are otherwise required for the functioning of the device, to wit, the detent wheel D, the detent arm E, and the position indicator H. Stop control for less than a single rotation of the detent wheel D could be achieved by providing no recessed portion 68*a* at all on the periphery of the ring 50 or by causing the finger 46 to cooperate with the unrecessed periphery of the ring 48. A stop action with fewer or more turns permitted can easily be effected simply by modifying the extent and rotational location of the recessed peripheral portion 68*a*.

While but a single embodiment of the present invention has been here specifically described, it will be apparent that many variations may be made therein, all within the scope of the instant invention, as defined in the following claims.

I claim:

1. A detent-limit stop assembly comprising a support, a detent wheel rotatably mounted on said support and having a plurality of detent recesses, and, between a pair of adjacent recesses, a part projecting radially outwardly from said detent wheel, a detent arm articulately mounted on said support for movement toward and away from said detent wheel and engageable with said detent recess and said part, resilient means active on said detent arm to urge it into engagement with said detent wheel, an element operatively connected to said detent arm for movement therewith between a first position when said detent arm is engaged with a detent recess and a second position spaced from said first position when said detent arm is engaged with said part, and a stop element movably mounted on said support, normally out of the path of movement of said element from said first to said second position, and operatively connected to said detent wheel so as to be driven thereby to a position in the said path of movement of said element at a predetermined point in the rotation of said detent wheel.

2. The assembly of claim 1, in which said stop element is moved to said position in said path of movement of said element only after said detent wheel has made more than a full revolution in a given direction.

3. The assembly of claim 2, in which said stop element is mounted coaxially with said detent wheel.

4. The assembly of claim 3, in which said assembly comprises a position indicator comprising first and second index elements carrying indicia and respectively movable to bring said indicia selectively to a display station, said first element rotating faster than said second element, said second element carrying said stop element.

5. The assembly of claim 2, in which said stop element is mounted coaxially with said detent wheel and its periphery is radially extended to comprise its said part movable into said path of movement of said element.

6. The assembly of claim 5, in which said assembly comprises a position indicator comprising first and second index elements carrying indicia and respectively movable to bring said indicia selectively to a display station, said first element rotating faster than said second element, said second element carrying said stop element.

7. The assembly of claim 2, in which said assembly comprises a position indicator comprising first and second index elements carrying indicia and respectively movable to bring said indicia selectively to a display station, said first element rotating faster than said second element, said second element carrying said stop element.

8. The assembly of claim 1, in which said assembly comprises a position indicator comprising an index element carrying indicia and movable to bring said indicia selectively to a display station, said index element carrying said stop element.

9. The assembly of claim 1, in which said assembly comprises a position indicator comprising first and second index elements carrying indicia and respectively movable to bring said indicia selectively to a display station, said first element rotating faster than said second element, said second element carrying said stop element.

10. The assembly of claim 1, in which said stop element is mounted coaxially with said detent wheel.

11. The assembly of claim 10, in which said assembly comprises a position indicator comprising an index element carrying indicia and movable to bring said indicia selectively to a display station, said index element carrying said stop element.

12. The assembly of claim 10, in which said assembly comprises a position indicator comprising first and second index elements carrying indicia and respectively movable to bring said indicia selectively to a display station, said first element rotating faster than said second element, said second element carrying said stop element.

13. The assembly of claim 1, in which said stop element is mounted coaxially with said detent wheel and its periphery is radially extended to comprise its said part movable into said path of movement of said element.

14. The assembly of claim 13, in which said assembly comprises a position indicator comprising an index element carrying indicia and movable to bring said indicia selectively to a display station, said index element carrying said stop element.

15. The assembly of claim 13, in which said assembly comprises a position indicator comprising first and second index elements carrying indicia and respectively movable to bring said indicia selectively to a display station, said first element rotating faster than said second element, said second element carrying said stop element.

16. A detent-limit stop assembly comprising a support, a detent wheel rotatably mounted on said support and having a plurality of detent recesses, and, between a pair of adjacent recesses, an operating part projecting radially outwardly from said detent wheel a distance more than at least some other of said parts between pairs of adjacent recesses, a detent arm articulately mounted on said support for movement toward and away from said detent wheel and engageable with said detent recess and said part, resilient means active on said detent arm to urge it into engagement with said detent wheel, an element operatively connected to said detent arm for movement therewith between a first position when said detent arm is engaged with a detent recess and a second position spaced from said first position when said detent arm is engaged with said other parts and a third position beyond said second position when said detent arm is engaged with said operating part, and a stop element movably mounted on said support, normally out of the path of movement of said element from said second to said third position, and operatively connected to said detent wheel so as to be driven thereby to a position in the said path of movement of said element at a predetermined point in the rotation of said detent wheel.

17. The assembly of claim 16, in which said stop element is moved to said position in said path of movement of said element only after said detent wheel has made more than a full revolution in a given direction.

18. The assembly of claim 16, in which said stop element is mounted coaxially with said detent wheel.

19. The assembly of claim 16, in which said stop element is mounted coaxially with said detent wheel and its periphery is radially extended to comprise its said part movable into said path of movement of said element.

20. The assembly of claim 16, in which said assembly comprises a position indicator comprising an index element carrying indicia and movable to bring said indicia selectively to a display station, said index element carrying said stop element.

21. The assembly of claim 16, in which said assembly comprises a position indicator comprising first and second index elements carrying indicia and respectively movable to bring said indicia selectively to a display station, said first element rotating faster than said second element, said second element carrying said stop element.

* * * * *